Patented Feb. 17, 1953

2,628,947

UNITED STATES PATENT OFFICE 2,628,947

STAIN FILLER SEALER

George L. Deniston and Orion William Berglund, Dayton, Ohio, assignors to Chadeloid Corporation, Wilmington, Del., a corporation of Delaware No Drawing. Application June 4, 1949, Serial No. 97,330

4 Claims. (Cl. 260—17.2)

This invention relates to wood finishing. More particularly it relates to a method of staining, filling and sealing wood. Still more particularly it relates to compositions which in a single application perform the three functions of staining wood, filling the pores, and sealing the surface preparatory to application of finish coatings.

Conventional stain fillers are known whereby the steps of staining, applying a wash coating of shellac and the like, and then applying a filler, have been reduced to a single operation. However, after these stain fillers are applied, the wood surface must be dried for at least 12 hours before the surface can be sanded and a sanding sealer applied.

Another disadvantage of prior commercial stain fillers is an oil vehicle is utilized. This oil is deposited on the surface of the wood in a thin film which does not dry readily. This film is still present when the lacquer is applied and tends to retard the drying and hardening of the lacquer film, which in turn slows down finishing operations.

It is an object of the present invention to overcome the disadvantages and difficulties associated with the above described stain fillers.

It is a further object of the present invention to provide wood finishing compositions which prepare the wood for final lacquer coating and finish coating.

It is a still further object of the present invention to provide a stain-filler-sealer in which there is no oil vehicle.

It is another object of the present invention to provide stain-filler-sealer compositions which seal the wood pores thereby eliminating the necessity for a sanding sealer.

A still further object of this invention is to produce a stain-filler-sealer composition which eliminates or reduces to a minimum shrinkage in the pores of the wood surface, thus leaving a prepared surface ready to receive a lacquer coat.

Still another object of the present invention is to provide a method of finishing wood wherein the stain-filling-sealing operation is performed in one step, and the wood prepared for lacquer spraying in less than ten minutes.

A still further object of the present invention is to provide a stain-filler-sealer composition of a transparency which brings out the natural grain of the wood.

A still further object of the invention is to simplify manufacturing procedure and to eliminate need for time consuming ball mill operations.

Still further objects and advantages of this invention will appear to those skilled in the art as the description proceeds.

In carrying out the objects of this invention, a coating composition is prepared which has incorporated therein, in addition to the stain filler components, dye and solvent, two different types of resins which apparently cooperate with one another to impart a sealing and hardening characteristic.

In a co-pending application by George L. Deniston, one of the inventors in the instant application, Serial No. 97,329, filed June 4, 1949, entitled: "Stain Filler Compositions and Pigmented Fillers Therefor," there is disclosed a stain filler having as a component of the composition certain air-drying resins.

These compositions, while excellent stain fillers, fail to have a sealing character. Now applicants have discovered that the combination of a pure air-drying alkyd or equivalent resin and a modified synthetic resin of the drying type having a short oil length, can be combined to impart to stain fillers the additional property of sealing the stained and filled wood surface.

As basic binder for the inerts, dyes and other components, resins of the alkyd type are preferred, particularly those dibasic acid base resins of the phthalic acid type, because they exhibit excellent air-drying which is so essential to the instant invention.

Other resins which may be used are the phenolics, maleics, esterified resins or rosins, urea-formaldehyde resins. An excellent example of fast drying alkyd resin of phthalic anhydride-glycerol base is sold under the trade name of Beckosol #1313 by Reichold Chemical Co., Inc. This particular resin sets up in approximately two minutes in air when spread as a thin film.

The companion or hardener resins which are necessary to obtain a resin combination having sealing characteristics are best exemplified by modified alkyd and modified phenolic resins. Excellent results are obtainable with a phenolic modified alkyd resin of phthalic anhydride-glycerol base such as is sold under the trade name of Beckosol #1338.

When utilizing combinations of resins such as is described above, it has been found that standard combinations of stain-filler solvents produce unsatisfactory sealer solutions. The new combination of solvent vehicles utilizes as the major component of the solvent mixture, condensed ketones such as, for example, di-acetone alcohol.

To this base component is added solvents which have solvent power for either the dyestuffs or the resins or both. Use of a single solvent simplifies formulation problems, but is not essential. Two or more compatible solvents having solvent power for one or the other of the basic constituents are equally effective.

The solvents in which acid organic dyestuffs are soluble are characterized by the presence of the hydroxyl group. Useful solvents having solvent power for resins as well as for the acid dyestuffs are the Carbitols, for example, diethylene glycol monoethyl ether, diethylene glycol monobutyl ether; the Cellosolves such as ethylene glycol monomethyl ether, ethylene glycol monoethyl ether, ethylene glycol monobutyl ether, tetrahydrofurfuryl alcohol and equivalent alcohols.

Additional solvents useful in various solvent combinations are the amino alkyl alcohols, such as methyl amino propanol, ethyl amino butanol, cyclic alcohols such as furfuryl alcohol, cyclohexanol in mixture with each other or in mixtures with volatile alcohols.

These volatile alcohols are usually added in the form of a thinner mixture often composed of aromatic hydrocarbon, such as toluol, xylol, aromatic naphthas and alcohol, but more often consisting simply of aliphatic alcohols, such as ethyl alcohol, propyl alcohol, butanol amyl alcohol. A minor proportion of esters of said aliphatic alcohols, such as ethyl acetate, propyl acetate, and the like, may sometimes be added to the thinner.

All acid organic dyestuffs are operative for the process and the product of this invention. Thus, for example, the following dyestuffs may be utilized: Buffalo Black NBR Conc. 126%, Black Stain B34951, Nigrosine 4523J Conc. Powder; the following yellow dyestuffs: Fast Wool Yellow 3GL Conc. 125%, Fast Light Yellow 3G Ex. Conc., Fast Light Yellow D3GA; the following orange-yellow dyestuffs: Metanil Yellow 1955, Calcocid Yellow MXXX Conc.; the following orange dyestuffs: Fast Light Orange 2G, Fast Light Orange GA Conc.; the following red dyestuffs: Azo Rubine Ex. Conc. 133%, Calcocid Milling Red 7B Conc., Camoisine BA Extra Conc. CF, Chromolan Bordeaux R. Croceine Scarlet MOO.

As filler materials, the following substances were found to be operative: Silene, which is a hydrated precipitated calcium silicate; Silex, which is a silica; calcium carbonate; diatomaceous earth; bentonite; asbestine; clay; and the like.

Certain of the fillers, such as silene and silex, are preferred because they can be used without darkening pigments and thereby impart a clearness and transparency to the coating composition. Further, they enhance the natural brilliance of the wood.

As inert pigments which have a darkening effect mainly upon the pores of the wood, we may utilize such materials as burnt umber, sienna, burnt sienna, iron oxides, carbon black, activated carbon and the like.

Additional substances which may be added to the composition to improve one or more characteristics are dispersing and bodying agents.

Useful dispersing agents are morpholine, which is a secondary amine, or sulfonates or sulfates such as the sodium salt of alkyl naphthalene sulfonic acid (Darvan) and sodium heptadecyl sulfate (Tergitol #7).

Bodying agents may be selected from such representative groups as the polyvinyl family and metal soaps. Polyvinyl alcohol is preferred, but other compounds, such as polyvinyl acetate, may be used in its place.

Representative metal soaps are aluminum stearate, magnesium stearate.

The compositions of this invention are prepared by simply mixing the ingredients together. Preferably the dye or dyes are wetted with methanol in an agitator such as a pony mixer. To the wetted dye mixture is added a solvent such as diethylene glycol monoethyl ether and the mixture agitated until all the dye is dissolved.

The mixture is continuously agitated while the other components, for example, diacetone alcohol, are added; then the resins; followed by polyvinyl alcohol; and lastly the fillers are added. A very simple and inexpensive method of manufacture, saves grinding time, and eliminates the use of expensive ball mills.

After thorough mixing, the composition is ready to be diluted to the desired consistency for brushing or spraying on to a wood surface.

After the stain-filler-sealer has been applied to the wood, the excess material is removed by padding or wiping which is standard stain-filler practice.

The stain-filler composition of this invention may be air dried in approximately eight minutes after wiping and then sprayed with lacquer. The lacquer coat is dried 30 to 60 minutes as desired before sanding and finishing to suit the operator.

Operations with the compositions of this invention may be speeded up by force drying. For example, the stain-filler-sealer may be force dried for five minutes at 120 to 140° F. immediately after it is wiped. It is then cooled for at least five minutes before the lacquer is sprayed.

The lacquer coat is air dried for a period of four to five minutes, and the coated wood returned to the same oven for approximately ten minutes. Upon its removal from the oven it is cooled for at least five minutes before sanding and then applying the next lacquer coat.

By use of force drying throughout the entire finishing process, the rubbing operation with rotten stone, oil, pumice or other types of rubbing compound, may be performed 30 minutes after drying of final drying lacquer coat.

The quantities of the basic constituents may be varied within reasonable limits depending upon the specific formulation desired. In general, it may be stated that a formulation including ethylene glycol monoethyl ether may have the ether and the companion alcohols which form a dye solvent vary from 5 to 50 parts methanol, 5 to 100 parts ethylene glycol monoethyl ether, and from 5 to 100 parts of di-acetone alcohol.

The dye may constitute from 1 to 50 parts or more of the dye-solvent solution, depending upon the amount of inerts which will be added at a later step.

The resins may be varied from 5 to 100 parts, depending upon the quantity of inerts being incorporated.

Polyvinyl alcohol, the preferred thickening agent, may be varied from 5 to 50 parts by weight.

Inasmuch as inerts cover a wide range of material, a specific proportion is very indefinite, but in general, it may be stated that the inerts may vary from 10 to 100 parts by weight.

When a thinner mixture of, for example, methanol, toluol and ethyl acetate is used, the methanol may constitute from 5 to 75 parts of the thinner mixture. Ethyl acetate may be varied from 5 to 15 parts, and the toluol may be varied from 5 to 25 parts by weight.

Dispersing agents in general may be varied from about 1 part by weight of the total mixture to 20 parts by weight of the total mixture.

In the following examples a few embodiments of the invention are illustrated and without intending thereby to limit the invention thereto.

Example I

The following formulation was mixed, as above explained, in a pony mixer with the ingredients being added in the sequence shown and in the relative proportions set forth:

| | Parts |
|---|---|
| 1. Methanol | 3.1 |
| 2. Mahogany dye | 2.4 |
| 3. Methyl carbitol ethylene glycol monoethyl ether | 3.5 |
| 4. Diacetone alcohol | 15.5 |
| 5. Air-drying phthalic anhydride-glycerol resin | 4.0 |
| 6. Phenol modified phthalic anhydride-glycerol resin | 6.0 |
| 7. Polyvinyl alcohol low vis | 3.0 |
| 8. Silex 325 mesh | 62.5 |

The above mixture was prepared for application as a stain-filler-sealer by thinning out 5.5 pounds of the mix with 1 gallon of a thinner composed of 35% by weight of methanol, 40% by weight of toluol, and 25% by weight of ethyl acetate. This gives a consistency suitable for spraying.

It will be recognized that the quantity and components of thinner may be varied to give any desired consistency, or that the proportions of thinners may be varied to alter the drying character of the stain-filler-sealer.

The above composition before dilution was stable and underwent no change during storage. However, when cut with thinners and dried, as explained above, the alkyd resins oxidized to form a tough coating in the pores of the wood.

Example II

| | Parts |
|---|---|
| Methanol | 9.1 |
| Mahogany dye | 3.4 |
| Methyl carbitol | 8.8 |
| Diacetone alcohol | 27.0 |
| Air-drying phthalic anhydride-glycerol resin | 11.5 |
| Phenol modified phthalic anhydride-glycerol resin | 17.2 |
| Polyvinyl alcohol low vis | 8.6 |
| Silene EF | 14.4 |

Example III

| | Parts |
|---|---|
| Methanol | 10.2 |
| Croceine orange dye | 13.1 |
| Croceine scarlet dye | 4.2 |
| Buffalo black dye | 3.5 |
| Tetrahydrofurfuryl alcohol | 5.6 |
| Diacetone alcohol | 24.9 |
| Tergitol #7 | 1.33 |
| Air-drying phthalic anhydride-glycerol resin | 10.6 |
| Phenol modified phthalic anhydride-glycerol resin | 15.9 |
| Silica | 2.3 |
| Bentonite | 2.4 |
| Burnt umber | 1.2 |
| Wood flour | 1.1 |
| Activated charcoal | 0.3 |
| Darvan #1 | .04 |
| Clay | 3.0 |

The stain-filler-sealer of the foregoing examples all produce compositions giving excellent surface which are relatively smooth and ready for lacquer finishing.

It will be understood that while there have been given herein certain specific examples of the practice of this invention, it is not intended thereby to have this invention limited to or circumscribed by the specific details of materials, proportions, or conditions herein specified, in view of the fact that this invention may be modified according to individual preference or conditions without necessarily departing from the spirit of this disclosure and the scope of the appended claims.

We claim:

1. A method of staining, filling and sealing wood in a single operation, the steps of applying to a wood base a solution-suspension consisting of a solvent base including 10.2 parts of methanol, 5.6 parts of tetrahydrofurfuryl alcohol, 24.9 parts of diacetone alcohol, 10.6 parts air-drying phthalic anhydride-glycerol resin, 15.9 parts of phenol modified phthalic anhydride-glycerol resin, 13.1 parts Croceine orange dye, 4.2 parts Croceine Scarlet dye, 3.5 parts Buffalo black dye, 1.33 parts sodium heptadecyl sulfate, 2.3 parts silica, 2.4 parts bentonite, 1.2 parts burnt umber, 1.1 parts wood flour, 0.3 part activated charcoal, .04 part sodium salt of alkyl naphthalene sulfonic acid and 3.0 parts clay; drying for a short period of time; and thereafter mechanically removing any excess material after a predetermined period of contact with the wood.

2. As a new article of manufacture, a stain-filler-sealer comprising acid organic dyestuff, an organic solvent for said dyestuff characterized by the presence of tetrahydrofurfuryl alcohol, diacetone alcohol, inert filler, pigment, an air-drying phthalic anhydride-glycerol resin in combination with a hardener resin comprising phenol modified phthalic anhydride-glycerol resin, to provide a resinous combination which imparts a sealing and hardening effect and reduces shrinkage of the composition upon application and drying.

3. As a coating composition for wood, a solution-suspension containing a solution of acid organic dyestuff in the presence of tetrahydrofurfuryl alcohol, an inert filler, diacetone alcohol, polyvinyl alcohol, an air-drying phthalic anhydride-glycerol resin in combination with a hardener resin comprising phenol modified phthalic anhydride glycerol resin, to provide a resinous combination which imparts a sealing and hardening effect and reduces shrinkage of the composition upon application and drying.

4. As a coating composition for wood, a solution-suspension containing tetrahydrofurfuryl alcohol, an inert filler comprising a mixture of silica and bentonite, the silica and bentonite being added in substantially equal parts by weight, diacetone alcohol, polyvinyl alcohol, an air-drying phthalic anhydride-glycerol resin in combination with a hardener resin comprising phenol modified phthalic anhydride-glycerol resin, to provide a resinous combination which imparts a sealing and hardening effect and reduces shrinkage of the composition upon application and drying.

GEORGE L. DENISTON.
ORION WILLIAM BERGLUND.

REFERENCES CITED

The following references are of record in the file of this patent:

UNITED STATES PATENTS

| Number | Name | Date |
|---|---|---|
| 2,161,503 | Bush | June 6, 1939 |
| 2,348,619 | Green et al. | May 9, 1944 |